March 14, 1950 — E. REED — 2,500,772
SCRAP CUTTING SHEAR
Filed June 3, 1948 — 2 Sheets-Sheet 1

INVENTOR.
Eo Reed.
BY Allen & Allen
ATTORNEYS.

March 14, 1950
E. REED
2,500,772
SCRAP CUTTING SHEAR
Filed June 3, 1948
2 Sheets-Sheet 2
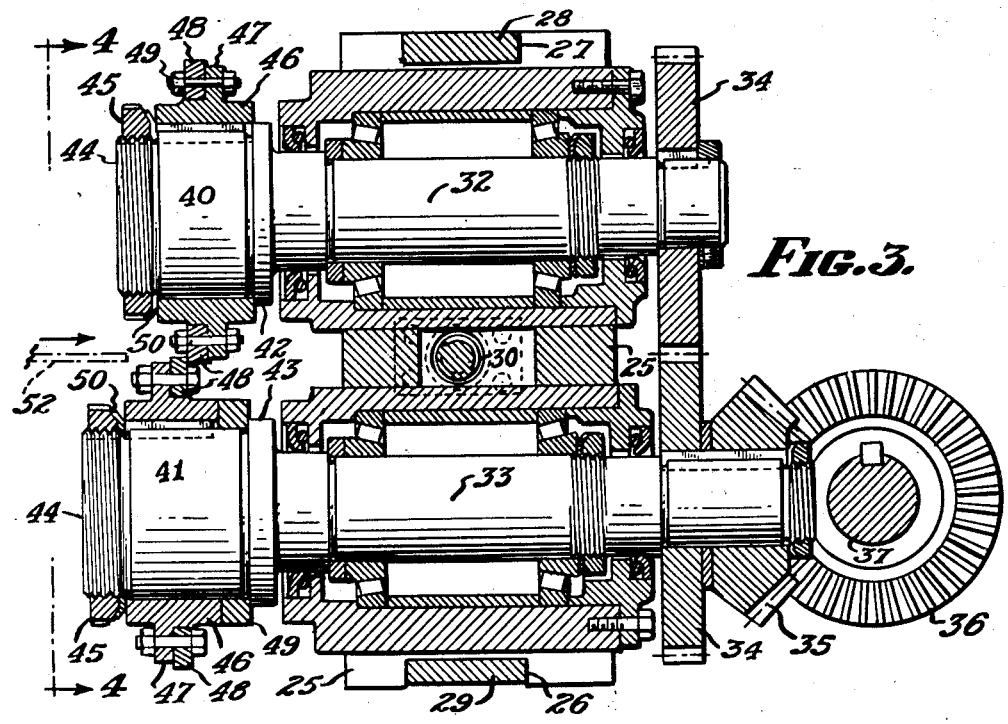
FIG. 3.
FIG. 5.
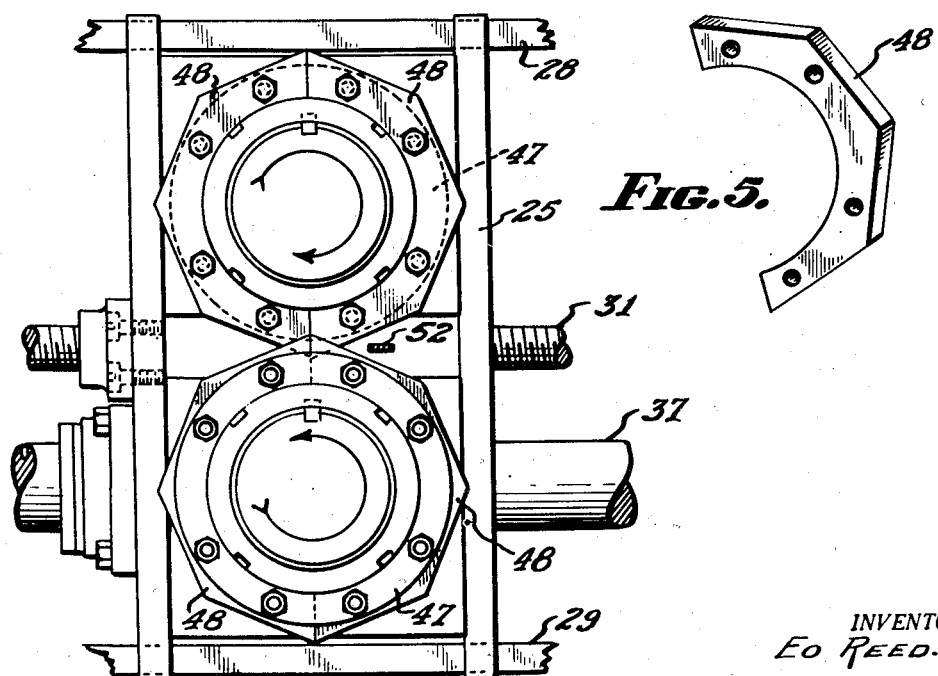
FIG. 4.
INVENTOR.
Eo Reed.
BY
Allen & Allen
ATTORNEYS.

Patented Mar. 14, 1950

2,500,772

UNITED STATES PATENT OFFICE 2,500,772

SCRAP CUTTING SHEAR

Eo Reed, Middletown, Ohio, assignor to Armco Steel Corporation, Middletown, Ohio, a corporation of Ohio Application June 3, 1948, Serial No. 30,780

6 Claims. (Cl. 164—10.6)

This invention relates to a scrap cutting shear and more particularly to a shear useful in connection with the cutting up of narrow strips of scrap metal which have been trimmed from the edges of the strip by means of a slitter shear.

Often the width of a strip must be finished to accurate dimensions and since the rolled strip may show minor variations in width, it is often the practice to pass the strip through a slitter shear in which one or both edges of the strip are slit to a finished dimension. Such slitter shears by themselves are well known and usually include a chute for delivering the scrap edges downwardly and out of the way.

The scrap from the slitter shear will be of varying width and will come from the shear in the form of a long ribbon. In such form the scrap is not easily disposable, and it is therefore an object of my invention to provide in association and combination with the slitter shear a shear for cutting the narrow strips of scrap metal into small pieces in which form they can be readily handled. It is therefore an object of my invention to provide in combination with a slitter shear a scrap cutting shear for cutting up the scrap strip into small pieces. It is an object of my invention where the strip is trimmed on both edges to provide two scrap cutting shears, one for the scrap coming from each side of the strip.

In connection with the foregoing objects, it is a further object of my invention to provide a novel scrap cutting shear in which the shear blades are polygonal in shape and counter-rotate. An ancillary object of my invention is to provide a shear in which for a relatively low speed of revolution of the shear members a relatively high cutting rate is achieved.

It is a still further object of my invention to provide a device as outlined above which will be simple to manufacture and which will be easily maintained.

These and other objects of my invention which I shall point out hereinafter or which will be apparent to one skilled in the art upon reading these specifications, I accomplish by that certain construction and arrangement of parts of which I shall now describe an exemplary embodiment.

Reference is made to the drawings forming a part hereof and in which:

Figure 3 is a cross sectional view on an enlarged scale taken on the line 3—3 of Figure 1.

Figure 4 is a cross sectional view taken on the line 4—4 of Figure 3.

Figure 5 is a perspective view of a cutter element.

Figure 1:
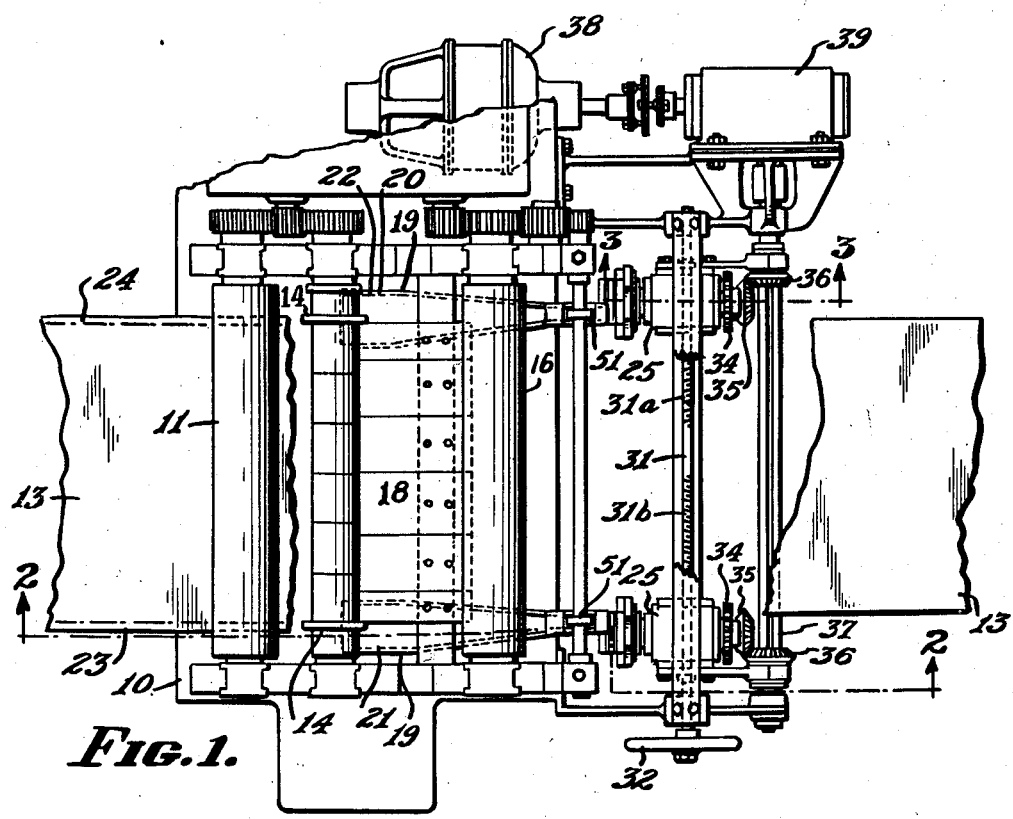
Figure 1 is a plan view with parts broken away showing my scrap cutting shear in association with a slitter shear.

I have shown in the drawings a slitter shear comprising a frame 10 and having mounted therein a pair of pinch rolls 11 and 12. The rolls 11 and 12 feed the strip 13, which is to be slit, to the slitter members proper indicated at 14 and 15. A pair of exit rolls are indicated at 16 and 17, and between the rolls 14, 15 and the rolls 16, 17 a table 18 is provided over which the strip passes. Along the edges just beyond the slitter members 14 and 15 there are provided the chutes 19 and 20, which are provided with the deflector members 21 and 22 to cause the edge portions of the strip 13, which have been trimmed off, to be deflected downwardly and into the chutes 19 and 20 respectively. In Figure 1 the lines along which the strip is slit are indicated at 23 and 24. The mechanism described above is conventional and by itself forms no part of the present invention.

I shall now describe my novel scrap cutting shear with particular reference to Figures 3, 4 and 5. Each of the shears comprises a frame work indicated generally at 25, provided at the top and bottom with the grooves 26 and 27, by means of which the housings or frame work are mounted for sliding movement on the cross bars 28 and 29 of the shear frame. Each of the housing members 25 is provided with a nut 30 in which is engaged a lead screw 31 provided with the hand wheel 32. The screw 31 has oppositely threaded portions as indicated at 31a and 31b, and, of course, the nuts 30 in the respective housing members 25 are of opposite hand as well, so that by rotation of the hand wheel 32 the housings 25 may be adjusted laterally, equally and oppositely.

In each housing there are mounted two shafts indicated respectively at 32 and 33. The shafts 32 and 33 are mounted in roller bearings as shown, although the roller bearings may be of any desired form or design. They themselves form no part of the present invention and will not be described in more detail. Each of the shafts has keyed to it a spur gear 34, which spur gears are in engagement with each other so that when the shaft 33 is driven, the shaft 32 will be driven through the spur gearing at an equal speed in the opposite direction. The shaft 33 carries also a miter gear 35, which is in engagement with a miter gear 36 on a shaft 37. The shaft 37 is driven from a motor 38 through a speed reducer 39. As is clearly shown in Figure 1, the drive just described, insofar as the gears 34, 35 and 36 are concerned, is reproduced at both members 25.

Each of the shafts 32 and 33 carries a shouldered hub indicated at 40 and 41 respectively, the shoulders being indicated respectively at 42 and 43. The outer ends of the hubs are provided with the threaded portions 44 for engagement by means of a lock nut 45. Each of the hubs 40, 41 has keyed to it a collar 46 provided with an upstanding peripheral flange 47. The collars 46 on the hubs 40, 41 respectively are identical. It will be noted that the upstanding peripheral flange 47 is off center and that the positions of the collars 46 are reversed on the hubs 40 and 41 respectively.

The cutter members themselves are polygonal and as shown in the present embodiment are octagonal. Each cutter member is made in two parts, the two parts together forming an octagon. One such cutter element is shown in perspective in Figure 5 and is indicated by the reference numeral 48. Two such members 48 are bolted as by means of bolts 49 to the flanges 47 as best seen in Figures 3 and 4. The cutter members 48 on the two hubs 40 and 41 are so oriented that their corners will pass the interaxial line between the centers of the hubs at the same time as clearly shown in Figure 4. The polygonal cutting elements are in shearing relation with each other as clearly shown in Figures 3 and 4, that is, the planes of the cutter members are axially offset. It will be recalled that the collars 46 for the two hubs are identical and are placed on the hubs oppositely. This expedient takes care at least in part of the necessary offsetting. Any additional offsetting may be taken care of by means of a spacing collar 49 on one of the hubs and by making one of the shoulders 43 thicker than the other shoulder 42.

The collars 46 are keyed to the respective hubs and are held in place thereon by the lock nuts 45 together with the lock washers 50 if desired.

Figure 2:
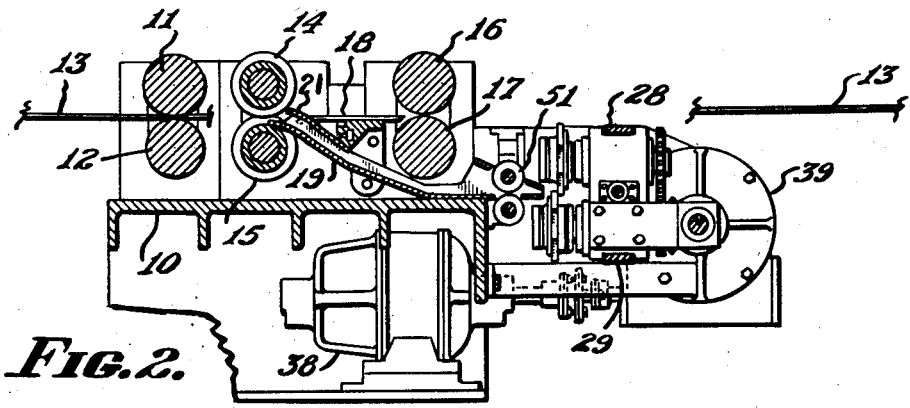
Figure 2 is a cross sectional view taken on the line 2—2 of Figure 1.

Each of the scrap shears is disposed opposite the delivery end of the chute 19 to receive the scrap edges therefrom. As best seen in Figure 2, a pair of pinch rolls 51 are provided to feed the scrap strip to the cutter elements of the scrap shear. The scrap strip to be sheared up into small pieces is fed to the scrap cutting shear along a line substantially parallel to the shafts 32 and 33 and displaced from the interaxial line in a direction contrary to the direction of rotation of the cutter elements. This can be clearly seen from a consideration of Figure 4 where a cross sectional element of edge scrap to be sheared is shown at 52.

In the present embodiment I have shown the cutter elements as being octagonal. With this arrangement there will be eight cuts performed per revolution of the shafts 32 and 33. It will thus be seen that with a relatively slow rate of rotation of these shafts a relatively high frequency of cutting is achieved so that the scrap is cut into very small pieces. If it is found unnecessary to cut the scrap into extremely small pieces, the rotational rate could be slowed down thereby saving wear and tear on the parts.

In setting up by device it is only necessary to adjust the hand wheel 32 to bring the scrap cutting shears opposite the edges which will be trimmed off. In a wider strip the members 25 must be separated, while in a narrow strip the members 25 must be brought toward each other.

By the construction described in connection with the collar members 46 a great simplification in manufacture is achieved in that the collars 46 may be used interchangeably on either of the hubs 40 or 41. The cutting elements 48 are also identical and can be used with the collars 46 on either of the hubs.

It will be understood that numerous modifications may be made in various details without departing from the spirit of my invention. I therefore do not intend to limit myself otherwise than as set forth in the claims which follow.

Having now fully described my invention what I claim as new and desire to secure by Letters Patent is:

1. A shear for cutting up narrow strips of scrap metal into small pieces, comprising a pair of congruent polygonal cutting elements rotatably mounted on parallel shafts in shearing relation to each other, means for driving said cutting elements at equal speeds in opposite directions, said elements being oriented with respect to each other so that the corners of said polygons cross the interaxial line between said shafts at the same time, and means for feeding narrow strips of scrap metal to said shear along a line parallel to said shafts but displaced from the interaxial line in a direction contrary to the direction of rotation of said cutting elements.

2. A shear according to claim 1, in which said shafts are provided with shouldered hubs, and in which each said hub carries keyed thereto a collar having an upstanding annular peripheral flange, said collar being held on said hub by a lock nut, said cutting elements being annular and being secured to said upstanding flanges.

3. A shear according to claim 2, in which the upstanding peripheral flange is off center in an axial direction with respect to said collar, and whereby a part at least of the axial offset required to bring said cutting elements into shearing relation to each other is achieved by reversing the flanged collar on one of said shafts.

4. A shear according to claim 3, in which any additional offset required is achieved by a thicker shoulder on one of said hubs.

5. A shear according to claim 3, in which any additional offset required is achieved by means of a spacing collar between said shoulder and collar on one of said hubs.

6. In combination with a slitter shear in which an edge of a strip of metal is trimmed to size and having a delivery chute for the scrap, a scrap cutter comprising a pair of congruent polygonal cutting elements rotatably mounted on parallel shafts in shearing relation to each other, said shafts being disposed parallel to the direction of delivery of said scrap, means for driving said cutting elements at equal speeds in opposite directions, said elements being oriented with respect to each other so that the corners of said polygons cross the interaxial line between said shafts at the same time, and means for feeding said scrap delivered from said slitter to said shear along a line parallel to said shafts but displaced from the interaxial line in a direction contrary to the direction of rotation of said cutting elements.

EO REED.

REFERENCES CITED

The following references are of record in the file of this patent:

UNITED STATES PATENTS

| Number | Name | Date |
|---|---|---|
| 2,251,312 | Yoder | Aug. 5, 1941 |
| 2,368,152 | McWilliams et al. | Jan. 30, 1945 |